United States Patent Office 3,123,582
Patented Mar. 3, 1964

3,123,582
LIQUID COATING COMPOSITION AND METAL SUBSTRATE COATED THEREWITH
Joseph J. Tryzna, Chicago, Ill., assignor to Continental Can Company, Inc., New York, N.Y., a corporation of New York
No Drawing. Filed Oct. 24, 1960, Ser. No. 64,284
7 Claims. (Cl. 260—43)

This invention relates to the provision of interpolymeric coating compositions which exhibit excellent adhesion and non-permeability when subjected to superheated steam.

It is known to provide compositions which can be applied to ferrous and non-ferrous metals, and then cured by baking; and to have the cured product of cross-linked or thermoset type. In practice, with prior compositions, exposure to superheated steam such as occurs during processing a foodstuff in a metal container having an internal lining of such cured product, frequently leads to loss of adhesion and to permeation of components of the foodstuff to the underlying metal and subsequently resulting in undesirable food and container spoilage.

According to the present invention, a liquid coating composition is prepared which upon curing acts to protect the metal surface at the interface, to establish a firm adhesion bond thereto; and to develop a film structure which resists permeation and deterioration in the presence of superheated steam.

In the illustrated practice of this invention, a solution of a glycidyl ether of a polyhydric phenol is prepared in an organic solvent. Such an ether can be made by reacting epichlorohydrin upon bis-(4-hydroxy phenyl)-2,2-propane; and illustratively has a melting point of 145 to 155 degrees C., and equivalent weight of 200, and an equivalency of 2400–4000; and averages more than one epoxy group per molecule. The solution can have a solids content of 32 percent by weight of the epoxy resin: the following solids additions are made, each by weight on the percentage basis of the epoxy resin: being 5.4 percent of a hydroxy-carboxylic acid (e.g., citric acid), 2.4 percent of tetrabutyl titanate, and 1 to 5 percent of orthophosphoric acid (85 percent concentration in water) are added and incorporated in succession. The composition in organic volatile solvent is then applied to a substrate such as untreated steel, commercial tin plate, aluminum, copper, or the alloys thereof: and subjected to a drying and baking schedule such as 10 minutes in a hot air convection oven at 420 degrees F.

By "equivalency" is meant the number of grams of the resin containing one gram equivalent of epoxide; and by "equivalent weight" is meant the number of grams of resin required to completely esterify a gram-molecule of monobasic acid, e.g., 280 grams of saturated $C_{18}$ acid or 60 grams of acetic acid.

The cured films exhibit excellent adhesion, flexibility, hot water and blush resistance: cured coatings on CMQ steel plate exhibited high resistance to heating with superheated steam at 240 to 255 degrees F.

The main film-forming component is an epoxy ether, or mixture of epoxy ethers, from the reaction of epichlorohydrin and bis-phenols. Preferably, this component has a melting point between 100 and 155 degrees C., a molecular weight of 1400 or over, preferably 4000 or more, an epoxide equivalency of 1000 to 4000, and an equivalent weight of 175 to 200, with the higher values being preferred.

Other phenolic compounds may be substituted in part or added to the above bis-(4-hydroxy phenyl)-2,2-propane, in preparation of the epoxy ether, so long as there is more than one epoxy group per molecule on the average. Thus, the epoxy ether does not need to be derived solely from a dihydric phenol; for example, epoxy novolacs, the so-called "oxirane" resins, and the like epoxy compounds can be employed.

Other resinous materials, such as urea-formaldehyde resin and phenol-aldehyde resin, may be added at any stage of preparation of the composition for conferring modified properties upon the final film. The preferred procedure is in the order given in the examples of practice, i.e., the introduction of the modifying resin follows the addition of the polycarboxylic acid. A most useful practice is the employment of a phenol-aldehyde resin in its water-insoluble B stage.

The phosphoric acid appears to act in the production of an insoluble phosphate complex which forms an interfacial layer at the metal with a strong connective bond between the metal and the rest of the film, and to inhibit corrosion by establishing a passivating action on the metallic surface incidental to forming the bond. The amount of phosphoric acid should be 0.1 percent to 5 percent, by weight of the epoxy resin. The ortho-phosphoric acid may be replaced in whole or part by a stoichiometric equivalent of phosphate salt which develops or is converted to acid orthophosphate upon heating. The proportion of phosphoric acid component depends upon the material of the substrate: thus 3 to 5 percent by weight may be employed with CMQ plate, or ½ to 3 percent with tin plate.

The citric acid is illustrative of polybasic hydroxy acids and anhydrides thereof. The amount of hydroxypolycarboxylic acid should be in the range of 0.1 percent to 12.5 percent by weight of the epoxy resin, with preferred use of 4.5 percent to 7.5 percent by weight of the epoxy resin. Other acid components which are usable comprise tartaric and malic acid.

The tetrabutyl titanate is illustrative of alkyl titanates: and may be present as 0.01 to 7.5 percent by weight based on the epoxy resin solids. Other stable titanate esters which do not readily hydrolyze at room temperature (i.e. at 20° C.–25° C. approximately) can be used, such as 2-ethylhexyl or so-called octyl titanate.

The phenol-aldehyde resin may be selected from the so-called alkali-condensed resole ethers group in which the phenol component includes some alkyl phenol such as octyl, nonyl or dodecyl phenol having in general a hydrocarbon chain of 6 to 18 carbon atoms; or from acid condensed novolac resins based on paraphenyl phenol. A desirable amount of phenol-aldehyde resin is 10 to 20 parts by weight to 90 to 80 parts by weight of the epoxy ethers; with 100 parts in all.

The shelf and pot life of the coating composition is good: and no specially lined container is necessary for storage. Specimens of these compositions have been stored for months in closed electroplated tin containers, without detrimental effects upon the container or upon the properties of the composition itself.

The curing proceeds with an inverse time:temperature function: e.g., with 15 minutes at 400 degrees F. up to a few seconds at 1500 degrees F. by so-called flash or flame techniques. Infra-red curing can be employed.

Fully cured coatings of desirable film weights have a clear golden coloration. The liquid coating compositions can have appropriate coloring material or fillers added, such as zinc, aluminum, zinc oxide and other metal oxides, mica, graphite, in finely powdered form.

The liquid coating composition consists basically of a solution in a volatile organic solvent of an epoxy phenol ether, a polybasic hydroxy acid or acid anhydride in equivalent weight, an alkyl titanate and an acid orthophosphate. The conjoint presence of the polybasic hydroxy acid or its anhydride, alkyl titanate and acid phosphate appears to give a composite or synergistic action not obtained with any one or two above in the presence of the epoxy phenol ether.

Suitable volatile solvents are ketones (particularly those containing methyl groups or normal straight chain hydrocarbon groups), esters, or mixtures of the same with ether alcohols or aromatic hydrocarbons. Such primary solvents can be diluted by alcohols, chlorinated hydrocarbons and lower liquid aliphatic hydrocarbons at ratios which do not affect the compatibility of the solutes or the clarity of the cured film.

Illustrative practices according to this invention are:

EXAMPLE 1

Into a glass flask provided with a stirrer, condenser and a heating unit were placed 600 grams of diacetone alcohol and 400 grams of epoxide resin made of epichlorohydrin and bis-phenol and having a melting point of about 150 degrees C., with epoxide equivalent of 2500–4000 and having an equivalent weight of about 200. The temperature was brought up to 150 degrees C. and kept closely to that temperature until the solution became uniformly clear. Then, 21.6 grams of citric acid in 86.4 grams of methyl Cellosolve was slowly added to the above with continuous stirring. This was followed by a slow addition of 74 grams of a B-stage phenol aldehyde resin of the alkali-condensed resole ether type. After the resulting solution became clear and homogeneous, the heating was discontinued and the solids content was brought down to 30 percent by the addition of 376 grams of methyl Cellosolve and 94 grams of butyl Cellosolve.

After the temperature of the solution reached 25–27 degrees C., 9.6 grams of tetrabutyl titanate, made up as 10 percent solution in 86.4 grams of equal proportions of n-butyl alcohol and methyl Cellosolve, were slowly added, and vigorous stirring continued until the solution become clear. After 60 minutes, approximately 23.5 grams of orthophosphoric acid at 85 percent concentration, prepared as 10 percent solution in 211.5 grams of n-butyl alcohol, was added and stirring continued for 25–30 minutes to obtain a uniform and homogeneous composition with good shelf life stability, with 26–27 percent resinous solids.

The above material can be applied as a coating by any conventional mode of application such as roll coating, dipping, spraying, flushing, etc., onto a metal substrate, such as an untreated black steel plate, at about 0.3–0.5 mil film thickness and subjected to a baking schedule, for example, 10 minutes at 420 degrees F. in a hot air convection oven. The resultant cured coating was a thermosetting polymerized film which possessed a good appearance and film continuity, excellent flexibility and fabrication properties, very good adhesion and hardness, very satisfactory chemical and solvent resistance including resistance to alkali and various acids, combined with good corrosion resistance, etc. It exhibited a very good resistance as an interior lining on food containers in superheated steam treatment at 10–15 lbs. pressure (240–255 degrees F.). The over-all results, combined with a satisfactory flavor characteristic and good resistance to blush, sulfide staining and softening or film deterioration, were far superior to the performance of any known presently available commercial coating. The cross-linking or polymerization of the above composition, with similar performance properties, can also be achieved by the use of the technique of flame curing when the employed temperature may reach 1500 degrees F. or over and baking time is shortened considerably.

When a similar composition was made up in the same way and comprised the same film forming resins, but with one or two of the modifying additives citric acid and alkyl titanate or phosphoric acid omitted, the resulting performance in the similar application was either unsatisfactory or much inferior to the results obtained with the instant composition.

EXAMPLE 2

A 40 percent solution, of the same epoxy resin in Example 1, was prepared in the same manner, using as solvent a mixture of equal proportions of methyl ethyl ketone, toluene and Cellosolve acetate. When clear, 5.25 percent of citric acid was added. This was followed by the addition of 16.6 percent of the phenolaldehyde resin. The phenolaldehyde resin was also from the alkali-condensed resole-ether type. After the resulting resin solution was reduced to 30 percent solids with Cellosolve acetate, and cooled until its temperature reached 75–80 degrees F., 2.4 percent of tetrabutyl titanate was incorporated as a 10 percent solution in n-butyl alcohol. Vigorous stirring was continued until this solution became clear and homogeneous. At this stage, 1 percent of phosphoric acid was added as 20 percent solution in Cellosolve acetate, and the mixing continued for about 30 minutes.

This composition was applied on electrotin plate and evaluated in exactly the same manner as that from Example 1. The resulting performance was equally satisfactory on specific application as a can lining for food products. In certain applications, the ability of such coating to withstand stamping operations was also considered as an additional asset. By the further addition of solvent such as butyl acetate, the above solution can be brought to spray viscosity, and the results in such application were also very satisfactory.

Similar results were obtained when in the above compositions of Examples 1 and 2, citric acid was replaced with tartaric acid.

EXAMPLE 3

A 33 percent solution of an epoxide resin with equivalent weight of 190 and epoxide equivalent of 1500–2000 and with a melting point of approximately 130 degrees C. (the resin available commercially under the name Epon 1007 was found satisfactory) was made up as a solution in diacetone alcohol and toluene used in equal proportions. The solution was heated under reflux condition until the solution became clear. 4.75 percent of citric acid as 20 percent solution in n-butyl alcohol was incorporated, followed by the addition of 15.5 percent of phenolic resin of the acid-condensed novolac type. The resulting solution was brought to 28 percent solids by the use of butyl-Cellosolve and 2-nitropropane in the ratio of 2:1. After the temperature of the resin solution attained approximately 75 degrees F.–80 degrees F., 1.75 percent of tetrabutyl titanate was added as a 10 percent solution in equiproportions of methyl Cellosolve and n-butyl alcohol and stirred vigorously until the solution became homogeneous. 2 percent of ortho-phosphoric acid was added. This composition showed a very good performance as a coating for aluminum plate and aluminum containers.

EXAMPLE 4

A 40 percent solution of the epoxy resin with the same characteristics and under the same condition as in Example 1, was made up as a solution in equal parts by weight of diacetone alcohol and toluene, followed by addition of 4.75 percent citric acid as 20 percent solution in n-butyl alcohol. While stirring was continued, 15 percent of alkylated urea formaldehyde resin was added. After the solution became clear, it was cooled to room temperature (75–80 degrees F.) and thinned to 25 percent solids by the use of methyl Cellosolve, toluene and xylene at 2:1:1 ratio; and 1.75 percent of butyl titanate as 10 percent solid in n-butyl alcohol was slowly added with continuous vigorous stirring. Finally, 1 percent of orthophosphoric acid was added as a 20 percent solution of 85 percent acid in n-butyl alcohol.

The resulting coating composition after being applied by roll coating method, and baked for 12 minutes at 420 degrees F., gave very satisfactory performance for specific application as a can lining on an electrotin plate substrate.

EXAMPLE 5

413 grams of 40 percent solution, comprising the same type of epoxy resin as set out in Example 3, was made under reflux condition in diacetone alcohol. The solution was cooled down to 75–80 degrees F. and heating discontinued. 45 grams of citric acid as a 20 percent solution in n-butyl alcohol was incorporated and stirred for approximately 15 minutes. At this stage, 30 grams of phenol-aldehyde resin of the above alkali-condensed resole-ether type was added, along with 320 grams at 1:1 ratio of diacetone alcohol and methyl Cellosolve. After 45 minutes of continuous stirring, 42 grams of butyl titanate as 10 percent solution in n-butyl alcohol was slowly added and vigorous stirring continued for about 60 minutes until the solution became clear. At this stage, 21 grams of phosphoric acid (85 percent concentration) as 10 percent solution in n-butyl alcohol was added to the mixture. After 15 minutes, while stirring was still continued, 21 grams of zinc dust (e.g., 325 mesh grade) and 31.5 grams of non-leafing aluminum paste (the latter at 66 percent concentration), was slowly added during the course of about 60 minutes. Vigorous stirring was continued until the resulting composition became uniform and free of any lumps. The coating composition was applied to untreated plain steel substrate and baked for 15 minutes at 415 degrees F. The resulting film showed very good corrosion and chemical resistant properties along with good adhesion and flexibility.

In the above examples, the solvent mixtures are stated by weight ratios; and the solid components where stated in percentage are in such proportion to the weight of the epoxy resin used.

The mechanism of the reaction which is taking place is not exactly known. However, there is a strong indication that the opening of the oxirane ring in epoxy polyethers is caused by simultaneous action of carboxyl, phosphate and alkyl groups from the citric acid, phosphoric acid, and tetra butyl titanate. This is followed by the reaction of the opened oxirane ring with the OH groups of a phenolic or similar resin. At the same time, the opened oxirane ring will react with alkyl titanate with resulting transetherification or interchange between alkyl and oxirane bearing chains after the ring has been opened. Due to the presence of phenolaldehyde or similar resin, there is also a transetherification of the above with alkyl titanate through the OH group from phenol. There is also a probable partial esterification of carboxylic acid with phenol caused by catalysis of alkyl titanate. Such esterification of phenol with citric or similar acid is aided by the use of phosphoric acid. The water of the reaction, together with atmospheric moisture, hydrolyses any unreacted alkyl titanate into the metallic oxide ($TiO_2$), which in all probability also enters into the polymerized film; and the water is bound against causing blushing. The end product of all these reactions, under the action of the appropriate curing temperature, is a better cross-linked interpolymeric structure of all entering components: i.e., film forming resins and modifiers. The chelating or sequestering characteristic of the modifiers used, along with passivating action of the unreacted free phosphate radical present, appear to contribute to the final unique performance, especially on untreated steel. The end result is a coating composition which, in various applications, especially as a lining for containers made of untreated black steel plate, is far superior to any known enamel in similar application.

The synergistic nature of reaction of all the above entering constituents can be noted by comparison of the results obtained by the use of the instant composition with like formulations from which alkyl titanate and phosphoric acid respectively were omitted and then these latter compositions applied to metal on top of coatings of alkyl titanate or phosphoric acid which had been applied in 5 percent solution as primers. The results of such latter compositions were poor or unsatisfactory.

The behaviors of the various compositions were evaluated at the same time, under exactly similar conditions, and on the same kind of metal plate. The most important properties from a commercial standpoint for the canning industry were taken as the criteria of evaluation. These characteristics are: good coverage, with a freedom from pin-holing or cratering; film continuity; flow; film appearance; good adhesion; good flexibility and fabrication in any application; acceptable process adhesion, as evaluated by hereafter described oxygenated spinach test, which is very important for acidic food substances; process resistance to meat and fish products, including resistance to staining and softening; resistance to blush and softening in aqueous media; resistance to corrosion (underfilm or filiform); resistance to high temperature, which is very important for soldering of enameled plate during can manufacture; and freedom from odor or flavor. In the following tables, the results are largely indicated in percentage value, where 100 is the best and 0 measuring a complete failure. Certain results are given in descriptive manner (i.e., good, poor, etc.).

*Table A*

[Compositions according to this invention]

| Code | Plate | Film Weight | Fab. | Oxyg. Spin. | Proc. Resist. | Resist. Boil., hrs. | Corr. Resist. | Resist. 700° F. |
|---|---|---|---|---|---|---|---|---|
| 1 | Tin | 5.0 | 100 | 99.4 | 90/100 | 5 | NT | Satisf. |
| 2 | Al | 4.5 | 100 | 98.8 | 100/100 | 5 | NT | NT. |
| 3 | Steel | 4.6 | 100 | 99.5 | 100/100 | 5 | Good | Satisf. |
| 4 | Steel | 4.9 | 100 | 99.8 | 100/100 | 5 | Good | Satisf. |
| 5 | Steel | 5.0 | 100 | 99.7 | 100/100 | 5 | Good | Satisf. |
| 6 | Al | 5.0 | 100 | 100.0 | 100/92 | 5 | NT | NT. |

*Table B*

[Comparison tests]

| Code | Plate | Film Weight | Fab. | Oxyg. Spin. | Proc. Resist. | Resist. Boil. | Corr. Resist. | Resist. 700° F. |
|---|---|---|---|---|---|---|---|---|
| 7 | Tin | 4.7 | 95 | 20.5 | 50/34 | F. 1 hr | NT | NT. |
| 8 | Steel | 4.4 | 91 | 8.2 | 92/10 | F. 1 hr | NT | NT. |
| 9 | Tin | 4.8 | 93 | 98.2 | 83.75 | F. 2 hr | NT | NT. |
| 10 | Steel | 4.6 | 95 | 16.8 | 100/50 | F. 1 hr | NT | NT. |
| 11 | Tin | 5.0 | 93 | 99.6 | 67/67 | F. 1 hr | NT | NT. |
| 12 | Steel | 4.8 | 95 | 55.8 | 100/92 | F. 2 hr | NT | NT. |
| 13 | Tin | 5.1 | 93 | 95.0 | 83/67 | F. 2 hr | NT | NT. |
| 14 | Steel | 5.0 | 81 | 85.0 | 95/100 | F. 1 hr | NT | NT. |
| 15 | Tin | 4.9 | 88 | 96.8 | 58/75 | F. 2 hr | NT | NT. |
| 16 | Steel | 4.7 | 93 | 90.0 | 90/95 | F. 2 hr | NT | NT. |
| 17 | Steel | 5.0 | 95 | 77.4 | 92/100 | F. 2 hr | NT | NT. |
| 18 | Tin | 4.5 | 0–10 | 94.4 | 58/50 | F. 1 hr | NT | NT. |

*Table C*

[Commercial can enamels]

| Code | Plate | Film Weight | Fab. | Oxyg. Spin. | Proc. Resist. | Resist. Boil. | Corr. Resist. | Resist. 700° F. |
|------|-------|-------------|------|-------------|---------------|---------------|---------------|-----------------|
| 19   | Steel | 3.8         | 90-93| 85-90       | 55/100        | F. 2 hr       | F to M        | M.              |
| 20   | Tin   | 1.8         | 14   | 90          | 95/100        | F. 4 hr       | M to P        | M to P.         |
| 21   | Tin   | 6.0         | 90   | 93          | 80/75         | NT            | NT            | P.              |
| 22   | Tin   | 6/1.5       | 90   | 94          | 85/90         | F.4 hr        | NT            | F to M.         |
| 23   | Steel | 6/1.6       | 95   | 90          | 90/95         | F.4 hr        | M             | F to M.         |

In the above tables, in the column "Plate," "Tin" designates commercial tin plate sold for making food cans, "Al" an aluminum, and "Steel" an untreated steel substrate; "Film Weight" indicates the milligrams of cured coating per square inch; "Fab." designates the evaluation of the coated sheet material, after drawing into can ends and then immersed in $CuSO_4$ solution for a standard time so that fractures and loss of adhesion are made visible by color change: with "100" denoting the absence of fractures or loss of adhesion, and "0" denoting complete failure, under microscopic examination at 20 power; "Oxyg. Spin." denotes the results under a standardized oxygenated spinach test: drawn can ends from the coated sheets are seamed onto cans containing oxygenated spinach, the cans are processed for at least one hour at 240 degrees F. in steam and stored for four days at room temperature: the cans are opened and the ends examined for enamel performance, with "100" denoting that the films remained perfect, and "0" denoting complete failure: in practice, the value should be at least 95; "Proc. Resist." denotes process resistance under a standard test by which the enameled strips are placed in a meat mixture and sealed in a can, which is processed for two hours at 15 lbs. external steam pressure: after cooling to room temperature, the strips are rubbed and examined for softening, loss of adhesion, and sulfide staining of the metal, the results being shown by two values, e.g., 90/100, of which the first value denotes the softening of the enamel and the second value the staining thereof: "100" denotes good performance, and "0" means very poor; "Resist. Boil." denotes resistance to boiling water, with a quick evaluation of softening and blush: test panels of the enameled sheets are immersed in boiling water and examined for loss of adhesion, softening and blush after 1, 2, 3, 4 and 5 hours: those withstanding the test for 4 or 5 hours are considered commercially satisfactory, noting that such is a maximum process time: "5 hrs." denotes that the specimen was found "good" with no blush and no observed softening after 5 hours; "F. 1 hr." denotes failure within one hour; "F. 2 hr.", failure within 2 hours, etc.; "Corr. Resist." denotes resistance to corrosion by placing the panels in a humidity cabinet under controlled conditions of temperature and relative humidity: to accentuate the severity of the conditions, the test panels were scratched through the enamel coating and exposed to hydrochloric acid fumes before being placed in the closed cabinet: the time was increased up to eightfold in testing the instant coatings: the results are reported as "good" to poor"; "Resist. 700° F." denotes the resistance to temperatures of 700 degrees F. or above: test panels with the cured coating thereon are brought into contact with a source of heat at such temperature for a short time, and the deterioration or burning of the enamel is noted visually; the results are stated as "good" or "satisfactory" to "poor" or "unacceptable"; "NT" denotes that no test was made; "F" denotes a fair performance; "M," a moderate one; "P," a poor one.

The "code" numbers describe the coating composition used:

1. Per Example 1: 1 percent $H_3PO_4$
2. Per Example 1: 1 percent $H_3PO_4$
3. Per Example 1: 5 percent $H_3PO_4$
4. Per Example 1: 3 percent $H_3PO_4$
5. Per Example 1: 4 percent $H_3PO_4$
6. Per Example 1: 5 percent $H_3PO_4$, different PF resin
7. Per Example 1: except no titanate or phosphoric acid
8. Same as 7
9. Per Example 1, except no phosphoric acid
10. Same as 9
11. Per Example 1, except no tetrabutyl titanate
12. Same as 11
13. Per Example 1, except no citric or phosphoric acid
14. Same as 13
15. Per Example 1, except no citric acid
16. Same as 15
17. Per Example 1, except no citric acid or tetrabutyl titanate
18. Same as 17
19. Epoxy resin, phenol-aldehyde resin, and phosphoric acid
20. Commercial phenolic resin coating
21. Oleoresinous commercial coating
22. Commercial oleoresinous enamel over primer coat comprising epoxy phenol aldehyde resin (double coat)
23. Same as 22

All practices according to this invention, codes 1 to 6, showed the required commercial properties in well-balanced form. The practices of codes 7 to 18, with omissions of one or two of the modifiers (citric acid, tetrabutyl titanate, and phosphoric acid), all showed deficiencies such as blush, blistering, softening, staining, or other unsatisfactory appearance. Code 19 showed blisters and rust. Code 20 showed very poor fabrication results. Code 21 showed blushing. Code 22 showed blush and stains. Code 23 showed blisters and stains.

Comparison tests were also performed with epoxy phenol aldehyde compositions over primer coats of alkyl titanate and/or phosphoric acid: the resulting performance was so poor, with unsatisfactory film flow and appearance, and extremely poor fabrication qualities that it was not possible to perform more detailed testing.

A balanced satisfactory performance in all tests is of the utmost importance for any acceptable coating in the canning industry. From the results shown in the tables, it is notable that the instant coating compositions exhibit very satisfactory balanced performance on various types of metallic substrates and specifically on untreated steel. They are also superior to any known existing enamel, including even the comparatively expensive but sometimes presently employed double coat system on CMQ steel plate. Moreover, the instant cured film has also very satisfactory adhesion for a subsequent overcoating such as one of vinyl or similar enamels, if such be desired. This is of prime importance in specialty applications or with storage of tin plate, as the instant compositions can then be employed in thin layers as a base or primer coat or as a single coating in specific applications where process resistance to superheated steam is of prime importance.

The foregoing results indicate a synergistic and cumulative specific reaction of all participating components.

The illustrative practices are not restrictive, and the invention may be employed in many ways within the scope of the appended claims.

What is claimed is:

1. A liquid coating composition comprising a solution in a volatile organic solvent of a glycidyl ether of a polyhydric phenol, a hydroxy-polycarboxylic acid compound selected from the group consisting of citric, tartaric and malic acids and anhydrides thereof in equivalent weight in the amount of 0.1 to 12.5 percent by weight of the glycidyl ether, an alkyl titanate selected from the group consisting of tetrabutyl and 2-ethylhexyl titanates in the amount of 0.01 to 7.5 percent by weight of the glycidyl ether, a hydroxyl-containing resin selected from the group consisting of phenol-aldehyde and urea-aldehyde resins in the amount of 11 to 25 percent by weight of the glycidyl ether, and a phosphoric acid compound in the amount (computed as ortho-phosphoric acid) of 0.1 to 5 percent by weight of the glycidyl ether.

2. A composition as in claim 1, in which the alkyl titanate is tetrabutyl titanate.

3. A composition as in claim 1, in which the phosphoric acid compound is ortho-phosphoric acid.

4. A composition as in claim 1, in which the hydroxyl-containing resin is an alkali-condensed phenol-aldehyde resole.

5. The method of preparing a metal coating, which comprises heating an epoxy ether in solution with a hydroxy polycarboxylic acid selected from the group consisting of citric, tartaric and malic acids and anhydrides thereof, and a hydroxyl-containing resin selected from the group consisting of phenol-aldehyde and urea-aldehyde resins, thereafter adding an alkyl titanate selected from the group consisting of tetrabutyl and 2-ethylhexyl titanates and a phosphoric acid compound, applying to a metal substrate, and baking to form a thermoset polymerized coating thereon.

6. An article comprising a metal substrate having thereon an adherent thermoset film obtained by baking a composition produced from a mixture of epoxy ether resin, a hydroxy-polycarboxylic acid compound selected from the group consisting of citric, tartaric and malic acids and anhydrides thereof, an alkyl titanate selected from the group consisting of tetrabutyl and 2-ethylhexyl titanates, and a phosphoric acid compound.

7. A liquid coating composition comprising a solution in a volatile organic solvent of a glycidyl ether of a polyhydric phenol, citric acid in equivalent weight in the amount of 4.5 to 7.5 percent by weight of the glycidyl ether, an alkyl titanate selected from the group consisting of tetrabutyl and 2-ethylhexyl titanates in the amount of 0.01 to 7.5 percent by weight of the glycidyl ether, a hydroxyl-containing resin selected from the group consisting of phenol-aldehyde and urea-aldehyde resins in the amount of 11 to 25 percent by weight of the glycidyl ether, and a phosphoric acid compound in the amount (computed as ortho-phosphoric acid) of 0.1 to 5 percent by weight of the glycidyl ether.

References Cited in the file of this patent

UNITED STATES PATENTS

| | | |
|---|---|---|
| 2,699,413 | Seagren et al. | Jan. 11, 1955 |
| 2,733,222 | Beacham | Jan. 31, 1956 |
| 2,742,448 | Beacham et al. | Apr. 17, 1956 |
| 2,810,674 | Madden | Oct. 22, 1957 |
| 2,856,094 | Gloyer et al. | Oct. 14, 1958 |
| 2,939,859 | Rumscheidt et al. | June 7, 1960 |